United States Patent

Rasmussen et al.

[11] Patent Number: 5,818,867
[45] Date of Patent: Oct. 6, 1998

[54] QPSK/QBL-MSK WAVEFORM ENHANCEMENT

[75] Inventors: Donald J. Rasmussen, Fort Wayne; Timothy P. Dempsey, Dempsey, both of Ind.; Daniel D. Shearer, III, Scottsdale, Ariz.

[73] Assignee: ITT Industries, Inc., White Plains, N.Y.

[21] Appl. No.: 708,807

[22] Filed: Sep. 9, 1996

[51] Int. Cl.[6] .............................. H04B 15/00; H04K 1/00; H04L 27/30

[52] U.S. Cl. .......................... 375/200; 332/103; 332/104; 375/316; 375/279; 375/280

[58] Field of Search ..................... 375/200, 274, 375/279, 280, 281, 206; 332/103, 104, 105

[56] References Cited

U.S. PATENT DOCUMENTS

| | | | |
|---|---|---|---|
| 4,945,545 | 7/1990 | Simon et al. | 375/53 |
| 4,962,510 | 10/1990 | McDavid et al. | 375/67 |
| 5,210,775 | 5/1993 | Takahara et al. | 375/67 |
| 5,361,047 | 11/1994 | Takahara et al. | 332/103 |
| 5,363,410 | 11/1994 | Hayashi | 375/67 |
| 5,528,631 | 6/1996 | Hayashi et al. | 375/283 |
| 5,535,245 | 7/1996 | Kim | 345/261 |
| 5,583,884 | 12/1996 | Maruyama et al. | 375/207 |
| 5,692,007 | 11/1997 | Durrant et al. | 375/206 |
| 5,696,796 | 12/1997 | Poklemba | 375/316 |

*Primary Examiner*—Stephen Chin
*Assistant Examiner*—Mohammed Ghayour
*Attorney, Agent, or Firm*—Plevy & Associates

[57] ABSTRACT

A modulator device is disclosed for a spread spectrum communication system which generates a modulated signal from incoming data. The device includes a QPSK portion for separating the incoming data into two data channels and for further spreading the two channels over a wide bandwidth according to a predetermined spreading code. A phase mapping element coupled to the QPSK portion for processing both channels in order to minimize spectral regrowth of the modulated signal by preventing the RF envelope deviation from going close to zero. Pulse shaping elements coupled to the phase mapping element for further processing each channel in order to improve the modulator spectral efficiency and minimize adjacent channel interference. A quad-mixer coupled to the pulse shaping elements for combining both channels into a recombined signal and for further modulating the recombined signal according to a predetermined carrier frequency.

20 Claims, 4 Drawing Sheets

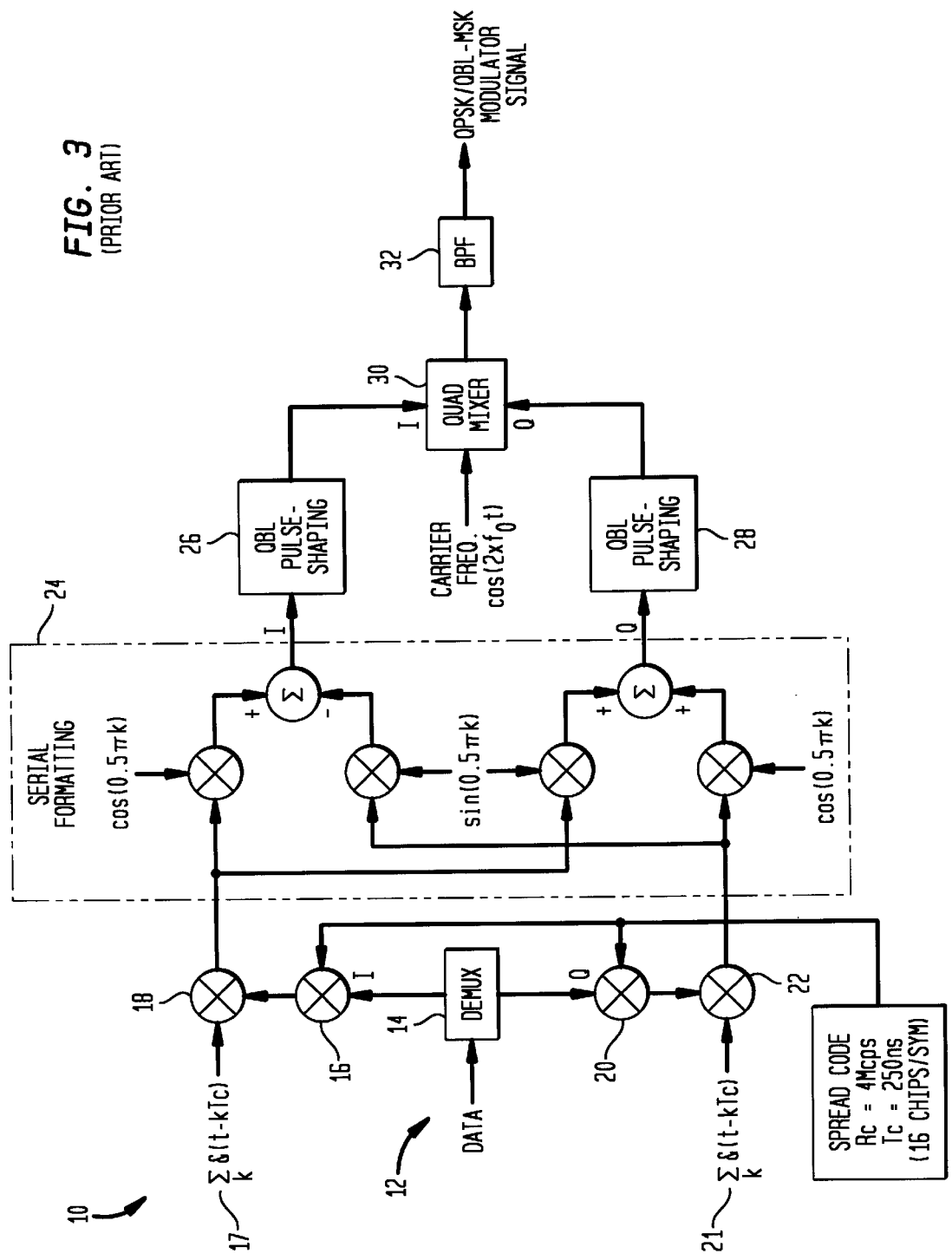

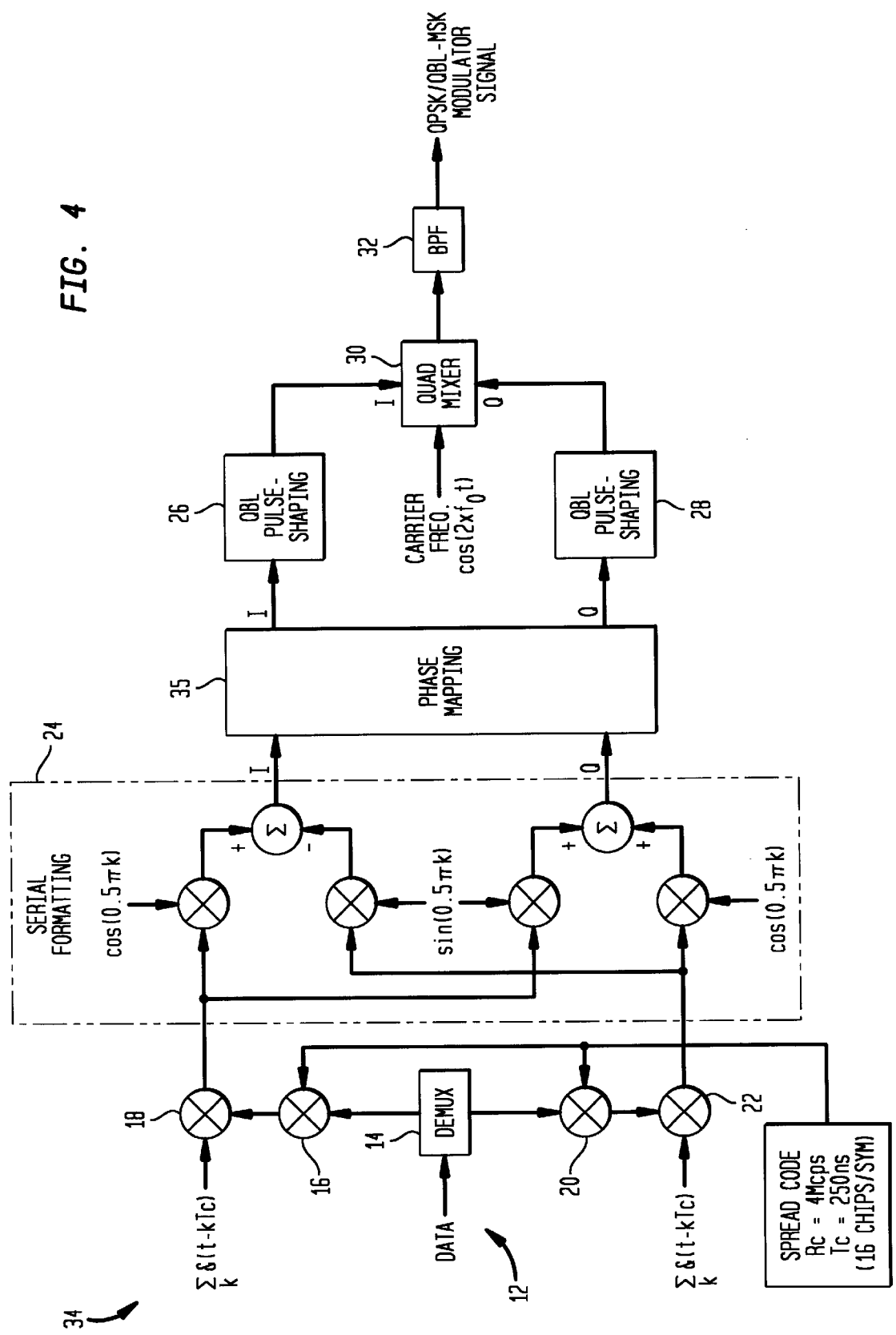

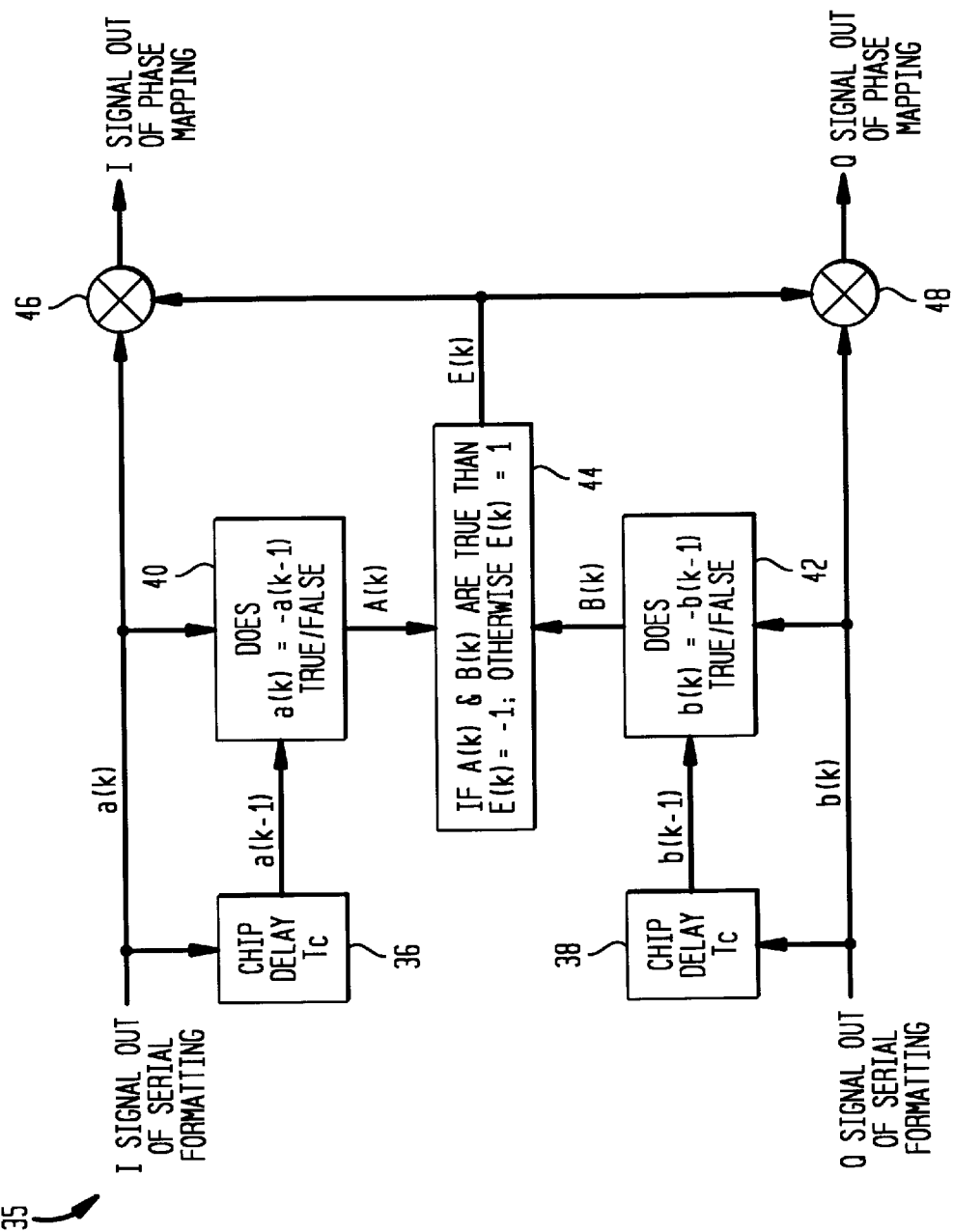

QPSK/QBL-MSK WAVEFORM ENHANCEMENT

BACKGROUND OF THE INVENTION

1. Field of the Invention

The present invention relates generally to spread spectrum communications and more particularly, to a modulating technique for spread spectrum systems which minimizes spectral regrowth for nonlinear power amplification.

2. Description of the Prior Art

Spread Spectrum Communications is a communication technique with a number of significant advantages. These advantages include selective addressing capability, low density power spectra, message screening capability and high interference rejection. In the past, Spread Spectrum Systems have been primarily utilized by the military in order to prevent jamming of radio and communication links, or to make it difficult to detect such signals. Today, Spread Spectrum Systems are increasingly being utilized in commercial applications where low sensitivity to interference is important.

Spread spectrum communications involves spreading the transmitted signal energy over a wide bandwidth utilizing a spreading function which is known at both the transmitter and receiver. The spreading function is typically defined by a binary sequence which is usually pseudo randomly generated. These sequences are often referred to as the chip sequences, which include binary symbols referred to as chips. A common spread spectrum technique is known as Direct Sequence Spreading. Direct sequence spreading includes directly multiplying a conventional narrow band signal by the chip sequence where the chip rate is higher than the data rate.

Pulse shaping techniques are utilized in Spread Spectrum systems in order to improve the modulator spectral efficiency and minimize adjacent channel interference. Quasi-bandlimited Minimum Shift Keying (QBL-MSK) is a pulse shaping technique which provides a significant improvement in modulator spectral efficiency over standard Minimum Shift Keying (MSK) techniques when operated with a linear power amplifier. Since QBL-MSK is not quite a constant envelope modulation waveform, nonlinear Class C power amplifications results in a small regrowth in the spectrum sidelobe levels. However, utilizing QBL-MSK pulse shaping results in a significant improvement in spectral efficiency over standard MSK even with sidelobe regrowth.

QBL-MSK pulse shaping is applied to spread spectrum radios by utilizing a Binary Phase Shift Keying (BPSK) technique to convey the data information. By utilizing BPSK data modulation, the QBL-MSK waveform structure is unmodified. This enables the advantages provided by the QBL-MSK pulse shaping to be directly applied to the spread spectrum signal. Spreading is easily applied to the BPSK Modulator by utilizing an exclusive-or device. FIG. 1 shows the power spectrum of a spread spectrum signal generated by a BPSK/QBL-MSK modulator at a rate of 4 Megachip per second (Mcps) with nonlinear amplification.

A technique known as Quadrature Phase Shift Keying (QPSK) is utilized to increase the data capability of a spread spectrum signal generated by QBL-MSK modulation. Utilizing the QPSK technique results in the data rate being increased by a factor of two. Proper serial formatting of the spread QPSK data enables a serial demodulator approach to be utilized in the corresponding receiver. QPSK data modulation modifies the spread spectrum signal so that the new waveform includes conditions where the RF envelope is close to or equals zero. These large RF envelope deviations result in a large increase of sidelobe level regrowth for non-linear Class C power amplification.

FIG. 2 shows the power spectrum of a spread spectrum signal generated by a QPSK/QBL-MSK modulator at a rate of 4 Mcps with nonlinear amplification. Comparing FIGS. 1 & 2, significant sidelobe regrowth results by utilizing QPSK data modulation. The QPSK/QBL-MSK signal has a sidelobe level at 10 MHz, which is only 50 dB down from the peak of the power spectrum, as compared to being 90 dB down for the BPSK/QBL-MSK signal. Adjacent channel noise for this limited modulation waveform is significantly degraded beyond that for a BPSK/QBL-MSK waveform. Sidelobe regrowth is significantly reduced by utilizing a Class AB power amplifier along with backing off on the input drive level.

The above described modulation techniques each have unique advantages and disadvantages. For example, BPSK/QBL-MSK modulation minimizes spectral regrowth when using non-linear power amplification, but offers lower data rate capability than QPSK/QBL-MSK. While QPSK/QBL-MSK modulation doubles the data rate capability offered by BPSK/QBL-MSK, but significantly increases spectral regrowth by nonlinear power amplification. QPSK/QBL-MSK modulation with Class AB power amplification and input level back off improves spectral efficiency at the price of power efficiency.

It is therefore, an object of the present invention to provide a QPSK modulation technique that minimizes spectral regrowth for nonlinear power amplification in spread spectrum systems.

SUMMARY OF THE INVENTION

A modulator device is disclosed for a spread spectrum communication system which generates a modulated signal from incoming data. The device includes a QPSK portion for separating the incoming data into two data channels and for further spreading the two channels over a wide bandwidth according to a predetermined spreading code and serial format. A phase mapping element is coupled to the QPSK portion for processing both channels in order to minimize spectral regrowth of the modulated signal by preventing the RF envelope deviation from going close to zero. QBL-MSK pulse shaping elements are coupled to the phase mapping element to provide the desired modulation waveform which improves the modulator spectral efficiency and minimize adjacent channel interference. A quad-mixer coupled to the pulse shaping elements provides the QPSK/QBL-MSK modulated waveform at a predetermined carrier frequency.

The phase mapping method disclosed includes delaying the individual data chips on both channels in order to generate past data chips for comparison with present data chips. Present data chips are inverted on both channels if the negative of the past data chips on both channels are equal to the present data chips on both channels. This modification to the data chips prevents the RF envelope from going close to zero.

BRIEF DESCRIPTION OF THE DRAWING

The above objects, further features and advantages of the present invention are described in detail below in conjunction with the drawings, of which:

FIG. 3 is a block diagram illustrating a prior art modulating technique for spread spectrum systems;

FIG. 4 is a block diagram of a modulator technique for spread spectrum systems according to the present invention;

FIG. 5 is a block diagram of a phase mapping element according to the present invention.

DETAILED DESCRIPTION OF THE DRAWING

Figure 1:
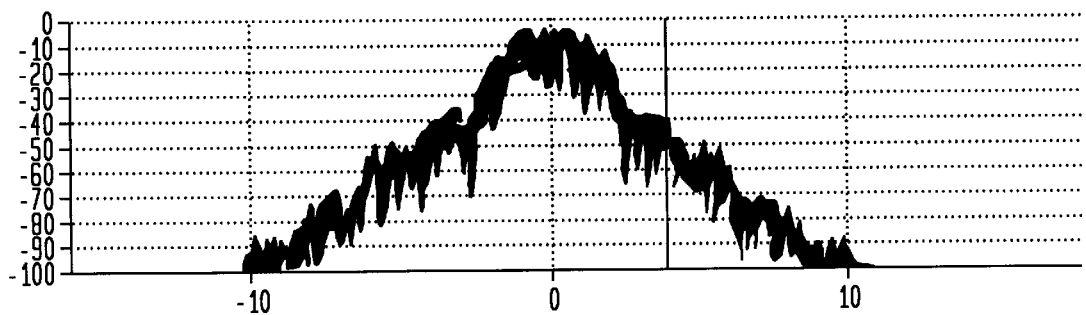
FIG. 1 is a power spectrum diagram of a spread spectrum signal generated by a prior art modulation technique.

The present invention is directed to a modulating technique which is utilized for enhancing the performance of spread spectrum systems. However, before describing the details of the present invention, a prior art modulating technique will be discussed.

Referring to FIG. 3, there is shown a block diagram illustrating a prior art modulation technique utilized in spread spectrum systems. This type of modulator 10 is known as a QPSK/QBL-MSK modulator. The modulator 10 includes a QPSK portion 12 which is utilized to convey the data information. As previously discussed, QPSK is utilized because it increases the data capability by a factor of 2. The QPSK portion 12 consists of the de-multiplexer 14 coupled to a first pair of mixers 16,20. The de-multiplexer 14 is utilized to seperate the incoming data into two channels consisting of either the odd or even data bits. The two channels produced by the de-multiplexer 14 are typically known as the I and Q channels, which modulate carrier frequencies that are normally 90 degrees out of phase. The I channel typically is known as the in phase channel, while the Q channel is typically known as the quadrature channel. The incoming data may have a rate of 500 Kilo-bits per second (Kbps), which means the I and Q channels have a rate of 250 Kbps.

The first pair of mixers 16,20 are utilized to mix the I & Q channels with the spreading code. This causes the data contained in the I & Q channels to be spread over a wide bandwidth, which is characteristic of spread spectrum systems. The spreading code is typically defined by a binary sequence which is usually pseudo randomly generated. Since QPSK/QBL-MSK modulation 10 is a direct sequence spreading type of technique, the chip rate of the spreading code is higher than the data rate. The chip rate may have a rate of 4 Mega-chips per second (Mcps).

Coupled to the first pair of mixers 16,20 is a second pair of mixers 18,22. The second pair of mixers are utilized to mix the I & Q channels with the sampling elements 17,21 after being spread. The sampling elements 17,21 weight a unit impulse function each chip period with the appropriate channel spread data by sampling the I & Q channels in the time domain. The sampling of both channels provides information which determines the magnitude and time to excite the pulse shaping elements 26,28, which will be described later.

The outputs of the pair of mixers 18,22 are both coupled to a serial formatting element 24. The serial formatting 24 configures the data on the I & Q channels in order to enable serial demodulation to be utilized in the corresponding receiver. Serial demodulation is desirable because it enables the corresponding receiver to demodulate the modulated signal by using a carrier frequency which is a quarter chip rate lower ($f_0 - \frac{1}{4}\pi$) than the modulator carrier frequency ($f_0$). Demodulating at this offset carrier frequency requires only a two correlator architecture as opposed to a four correlator architecture required for a demodulator using the modulator carrier frequency ($f_0$). The serial formatting 24 produces I & Q channel signals having the following form:

$$I = I(k) \cos(0.5 \pi k) - Q(k) \sin(0.5 \pi k) \quad (1)$$

$$Q = Q(k) \cos(0.5 \pi k) + I(k) \sin(0.5 \pi k) \quad (2)$$

where,

I(k) is the sampled I channel data,

Q(k) is the sampled Q channel data, and k is the sample point (positive integer).

Coupled to the I & Q channel outputs of the serial formatting element 24 are QBL-MSK pulse shaping elements 26,28. As previously described, pulse shaping is utilized in Spread Spectrum systems in order to improve the modulator spectral efficiency and minimize adjacent channel interference. In particular, QBL-MSK pulse shaping provides a significant improvement in modulator spectral efficiency over standard MSK techniques when operated with a linear power amplifier. The QBL-MSK pulse shaping elements 26,28 are implemented by filters expressed by the following function q(t):

$$q(t) = [\mathrm{sinc}\{\pi(t - 2T_c)/2T_c\}]^3; \text{ for } 0 \leq t \leq 4T_c \text{ and, } 0; \text{ for elsewhere, } (3)$$

where, $T_c$ is a chip period having a value of 250 nano-seconds for a 4 Mcps chip rate.

Coupled to the output of the pulse shaping elements 26,28 is a quad-mixer 30. The quad-mixer 30 prepares the data on the I and Q channels to be transmitted. This is accomplished by first modulating the I channel with a carrier signal of $\cos(2\pi f_0 t)$ and Q channel with a carrier signal of $\sin(2\pi f_0 t)$, and then recombining the modulated I and Q channels. The predetermined frequency of the carrier signals are defined as $f_0$. Coupled to the quad-mixer 30 is a band pass filter 32, which is utilized to eliminate spurious signals generated by the carrier mixing operation. In order to accomplish this, the filter 32 bandwidth is selected to pass the modulated signal with minimal signal distortion.

Figure 2:
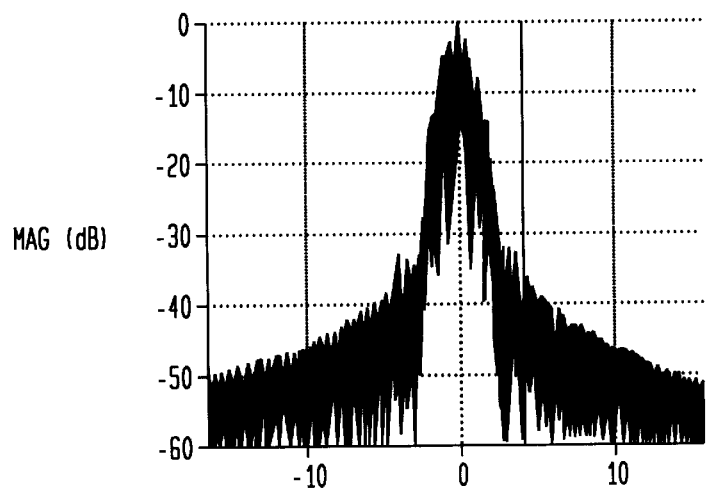
FIG. 2 is a power spectrum diagram of a spread spectrum signal generated by another prior art modulation technique.

As can be seen from FIG. 3, a QPSK/QBL-MSK Modulator signal is developed at the output of the band pass filter 32. The power spectrum for such a modulated signal followed by a nonlinear Class C amplifier is shown in FIG. 2. As previously described, this type of modulation results in significant sidelobe regrowth, which is undesirable in spread spectrum systems. The spectral regrowth is caused by the RF envelope deviation going close to or equal to zero. As can be seen from FIG. 2, significant sidelobe regrowth is evident by the sidelobe level being 50 dB down at 10 MHz from the power spectrum center frequency of this signal. This sidelobe regrowth is significantly reduced by utilizing a Class AB power amplifier along with backing off on the input drive level. Although, this approach provides improved spectral efficiency, it also significantly reduces power efficiency.

Referring to FIG. 4, a block diagram of a modulator technique for spread spectrum systems according to the present invention is shown. This modulator 34 is similar to the previously described prior art modulator, except for the phase mapping element 35. In the present invention, the phase mapping element 35 is coupled between the serial formatting element 24 and the pulse shaping elements 26,28. The phase mapping 35 further processes the I and Q channels in order to minimize sidelobe regrowth without requiring the use of Class AB amplification. Since Class AB amplification is not required, power efficiency of the modulator 34 is significantly improved.

The phase mapping 35 minimizes spectral regrowth for non-linear power amplification by preventing the RF envelope deviation from going close to or equal to zero. These undesirable conditions occur during symbol changes when the QPSK data take on one of four phase states. By modifying the phase change for the spread modulation waveform, the unwanted RF envelope deviation conditions are prevented. Phase mapping reduces the number of effective spreading chips by two spreading chips for each modified phase condition. For example, a system with a spreading gain of 16 chips/symbol is reduced to 14 chips/symbol for each modified phase condition. For unmodified phase conditions, the spreading gain remains at 16 chips/symbol. Since the probability of a modified and unmodified phase condition is equal, the average spreading gain for random data is reduced to 1 chips/symbol, which corresponds to a loss of only 0.3 dB. However, when the processing gain of the modulator 34 is increased, the spread gain loss is reduced.

Referring to FIG. 5, there is shown a block diagram of a phase mapping element according to the present invention. As previously described, the phase mapping 35 minimizes spectral regrowth of the modulated signal by preventing the RF envelope deviation from going close to or equal to zero. This is accomplished by comparing the present data modulated chips a(k),b(k) and past data modulated chips a(k−1),b(k−1) of both the I & Q channels to see if an inversion occurred. If the data modulated chips are inverted on both the I & Q channels, the RF envelope either goes close to or is equal to zero. To prevent this undesirable condition, the present data modulated chip of both the I & Q channels are then inverted.

During operation, the phase mapping 35 receives a continual stream of modulated data chips from both the I & Q channels, wherein the chips from the I channel are represented by a(k) and the chips from the Q channel are represented by b(k). The chips from both channels a(k),b(k) are delayed by delay elements 36,38 having a predetermined delay value of a chip period ($T_c$). The present data chips a(k),b(k) are then compared to the delayed (past) data chips a(k−1),b(k−1) to see if the negative of the past data chips a(k−1), b(k−1) are both equal to the present data chips of both channels a(k),b(k) 40,42. If this is true, an inverting signal E(k) is developed 44 that causes the mixers 46,48 to invert the data chips a(k),b(k). This prevents the RF envelope from either going close to or equal to zero, which is the undesirable condition that causes sidelobe regrowth. This inversion reduces the spreading gain of the eventual modulated waveform by two chips. Half of the possible spread data conditions result in the implementation of this correction. Therefore, the average processing gain for all data conditions is reduced by one chip.

If the negative of the past data chips a(k−1),b(k−1) are both not equal to the present data chips of both channels a(k),b(k) 40,42, then a non-inverting signal E(k) is developed 44 that causes the mixers 46,48 to pass the data chips a(k),b(k) unchanged. The above described comparison 40,42 and inverting 44 is performed on every data chip a(k),b(k) received by the phase mapping 35. This results in a QPSK/QBL-MSK modulated signal that has a minimal amount of spectral regrowth as can be seen from the power spectrum diagram of FIG. 6.

Figure 6:
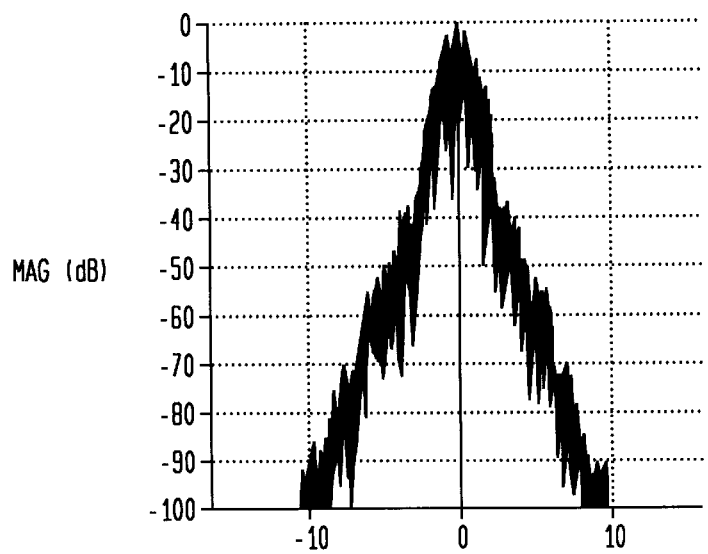
FIG. 6 is a power spectrum diagram of a spread spectrum signal generated by a modulation technique according to the present invention.

Referring to FIG. 6, a power spectrum diagram of the spread spectrum signal generated by the modulation technique according to the present invention is shown. This figure represents the resulting power spectrum for the QPSK/QBL-MSK waveform with phase mapping for non-linear power amplification at a 4 Mcps rate.

By comparing FIG. 6 with FIG. 2, it is evident that by utilizing phase mapping, a significant reduction in spectral regrowth is achieved. At 10 MHz from the center frequency of the power spectrum, phase mapping reduces the sidelobe level from 50 dB below the peak of the power spectrum to better than 90 dB. Phase mapping also achieves the same spectral roll-off as produced by utilizing BPSK/QBL-MSK modulation. Thus, the modulating technique of the present invention provides improved spectral efficiency without losing a significant amount of power efficiency. A small degradation in processing gain results by utilizing phase mapping. However, for a 16 chip/symbol system, the resulting degradation is only 0.3 dB. By increasing the processing gain, this loss becomes even smaller.

The primary purpose of the modulating technique of the present invention is to reduce spectral regrowth of the QPSK/QBL-MSK modulated signal for non-linear amplification applications. However, other possible applications are possible. For example, this technique is able to apply QPSK data modulation to other spectral waveforms, such as Minimum Shift Keying, Gausian MSK, Tamed Frequency Modulation, Inter-symbol Jitter Free Offset Quadrature Phase Shift Keying and bandwidth efficient Continuous Phase Modulation (CPM) schemes. Bandwidth efficient CPM waveforms allow the spreading rate to increase for more processing gain or reduction in the spreading bandwidth to increase the number of available channels.

While the invention has been particularly shown and described with reference to preferred embodiments thereof, it will be understood by those skilled in the art that changes in form and details may be made therein without departing from the spirit and scope of the present invention.

What is claimed is:

1. A modulator device for a spread spectrum communication system which generates a modulated signal from incoming data, comprising:

a QPSK portion for separating the incoming data into two data channels and for further spreading said two channels over a wide bandwidth according to a predetermined spreading code;

a phase mapping element coupled to said QPSK portion for processing both said channels in order to minimize spectral regrowth of the modulated signal by preventing the RF envelope deviation from going close to zero;

pulse shaping elements coupled to said phase mapping element for further processing both said channels in order to improve the modulator spectral efficiency and minimize adjacent channel interference; and a quad-mixer coupled to said pulse shaping elements for combining both said channels into a recombined signal and for further modulating said recombined signal according to a predetermined carrier frequency.

2. The device of claim 1, wherein said QPSK portion includes a de-multiplexer for separating the incoming data.

3. The device of claim 2, wherein said QPSK portion further includes a first pair of mixers for spreading both said channels.

4. The device of claim 3, which further includes sampling means coupled to each of said first pair of mixers for sampling both said channels at a predetermined frequency.

5. The device of claim 1, which further includes a band pass filter coupled to said quad-mixer.

6. The device of claim 1, which further includes a serial formatting element coupled between said QPSK portion and said phase mapping element.

7. The device of claim 6, wherein said serial formatting element produces signals on said two channels having the following form:

$$I^*\text{Cos}(0.5\ \pi k) - Q^*\text{Sin}(0.5\ \pi k)$$

$Q^*\text{Cos}(0.5\ \pi k) + I^*\text{Sin}(0.5\ \pi k)$, where I & Q represent the two original data channels and k represents the sample point.

8. The device of claim 1, wherein said phase mapping element selectively inverts the individual data chips included in both said channels.

9. The device of claim 8, wherein said data chips are selectively inverted by continually comparing present data chips to past data chips of both said channels and further inverting said present data chips of both said channels if the negative of said past data chips of both said channels is equal to said present data chips of both said channels.

10. The device of claim 1, wherein the said past data chips are generated by delay elements.

11. The device of claim 1, wherein said inversion of said present data elements is accomplished by a third pair of mixers.

12. The device of claim 1, wherein said pulse shaping elements are filters having the following function q(t):

$$q(t) = [\text{sinc }\{\pi(t-2T_c)/2T_c\}]^3;\ \text{for }0 \leq t \leq 4T_c \text{ and, 0; for elsewhere,}$$

where $T_c$ is a predetermined delay value.

13. A method for producing a spread spectrum signal from incoming data, said method comprising the steps of;
    separating the incoming data into two data channels;
    spreading both said channels over a wide bandwidth according to a predetermined spreading code;
    phase mapping both said channels in order to minimize spectral regrowth of the modulated signal by preventing the RF envelope deviation from going close to zero;
    pulse shaping both said channels in order to improve the modulator spectral efficiency and minimize adjacent channel interference;
    combining both said channels into a recombined signal; and
    mixing said recombined signal with a predetermined carrier frequency.

14. The method of claim 13, wherein said separating step is performed by a de-multiplexer.

15. The method of claim 13, wherein said spreading of both said channels is performed by a first pair of mixers.

16. The method of claim 13, which further includes sampling both said channels at a predetermined frequency after said spreading.

17. The method of claim 13, which further includes serial formatting both said channels after said spreading, said serial formatting produces signals on both said channels having the following form:

$$I^*\text{Cos}(0.5\ \pi k) - Q^*\text{Sin}(0.5\ \pi k)$$

$Q^*\text{Cos}(0.5\ \pi k) + I^*\text{Sin}(0.5\ \pi k)$, where I & Q represent the original two data channels and k represents the sample point.

18. The method of claim 13, wherein said phase mapping selectively inverts individual data chips included in both said channels.

19. The method of claim 18, wherein the selective inversion of said individual data chips is accomplished by:
    delaying said individual data chips of both said channels in order to generate past data chips;
    comparing present data chips to past data chips of both said channels; and
    inverting the present data chips of both said channels if the negative of said past data chips of both said channels is equal to said present data chips of both said channels.

20. The method of claim 13, wherein said pulse shaping is accomplished by filters having the following function q(t):

$$q(t) = [\text{sinc }\{\pi(t-2T_c)/2T_c\}]^3;\ \text{for }0 \leq t \leq 4T_c \text{ and, 0; for elsewhere,}$$

where $T_c$ is a predetermined delay value.

* * * * *